US011255952B2

(12) United States Patent
Abari et al.

(10) Patent No.: US 11,255,952 B2
(45) Date of Patent: Feb. 22, 2022

(54) IMAGE SENSOR PROCESSING USING A COMBINED IMAGE AND RANGE MEASUREMENT SYSTEM

(71) Applicant: Woven Planet North America, Inc., Los Altos, CA (US)

(72) Inventors: Farzad Cyrus Foroughi Abari, San Bruno, CA (US); Romain Clément, Campbell, CA (US)

(73) Assignee: Woven Planet North America, Inc., Los Altos, CA (US)

(*) Notice: Subject to any disclaimer, the term of this patent is extended or adjusted under 35 U.S.C. 154(b) by 0 days.

(21) Appl. No.: 16/943,992

(22) Filed: Jul. 30, 2020

(65) Prior Publication Data

US 2021/0011165 A1    Jan. 14, 2021

Related U.S. Application Data

(63) Continuation of application No. 15/990,287, filed on May 25, 2018, now Pat. No. 10,739,462.

(51) Int. Cl.
| | | |
|---|---|---|
| *G01S 17/89* | (2020.01) | |
| *G01S 7/481* | (2006.01) | |
| *G01S 17/42* | (2006.01) | |
| *H04N 13/282* | (2018.01) | |
| *G01S 17/931* | (2020.01) | |
| *G01S 17/894* | (2020.01) | |

(52) U.S. Cl.
CPC .............. *G01S 7/4815* (2013.01); *G01S 17/42* (2013.01); *G01S 17/89* (2013.01); *G01S 17/894* (2020.01); *G01S 17/931* (2020.01); *H04N 13/282* (2018.05)

(58) Field of Classification Search
None
See application file for complete search history.

(56) References Cited

U.S. PATENT DOCUMENTS 10,094,925 B1 * 10/2018 LaChapelle ............. G01S 7/497
2018/0113200 A1 * 4/2018 Steinberg ............... G02B 26/10

* cited by examiner

*Primary Examiner* — Christopher G Findley
(74) *Attorney, Agent, or Firm* — Christopher G. Darrow; Darrow Mustafa PC (57) ABSTRACT

In one embodiment, an apparatus includes a transmitter operable to transmit a first light beam from a light source. The apparatus also includes a receiver operable to receive a plurality of return light beams and direct the plurality of return light beams through a first beam splitter to an imaging sensor and a LiDAR sensor. The imaging sensor may be operable to process a first portion of the return light beams into image profile data, and the LiDAR sensor may be operable to process a second portion of the return light beams into depth profile data. In addition, the first and second portions of the return light beams may be received from a shared field of view.

20 Claims, 7 Drawing Sheets

IMAGE SENSOR PROCESSING USING A COMBINED IMAGE AND RANGE MEASUREMENT SYSTEM

PRIORITY

This application is a continuation application under 35 U.S.C. § 120 of U.S. patent application Ser. No. 15/990,287, filed 11 Aug. 2020.

BACKGROUND

Light Detection and Ranging (LiDAR) is a sensing method that uses a light beam to measure the distance to various objects. A LiDAR sensor works by emitting a light beam and measuring the time it takes to return. The return time for each return light beam is combined with the location of the LiDAR sensor to determine a precise location of a surface point of an object, and this location is recorded as a three-dimensional point in space. An optical camera captures and records images of the external environment. A camera works by opening an aperture to take in light through a lens, and then a light detector (e.g., a charge-coupled device (CCD) or CMOS image sensor) turns the captured light into electrical signals including color and brightness of each pixel of the image.

Autonomous vehicles typically use a LiDAR sensor to obtain depth profiles of the environment, and an optical camera to obtain image profiles of the environment in order to help navigate the vehicle around the environment. However, because the LiDAR sensor is placed next to a separate imaging sensor, data from the LiDAR sensor must be calibrated and aligned with the data from the imaging sensor. In addition, problems with alignment may arise due to the distance between the position of the LiDAR sensor and the position of the imaging sensor and changes in thermal amplitudes over the course of the day in each of the components. Moreover, both components may be prone to drift and calibration errors caused by vibrations inherent in vehicular movement.

DESCRIPTION OF EXAMPLE EMBODIMENTS

Transportation management technology for "smart" vehicles may be used for intelligent transportation and user interaction to help optimize vehicle safety, efficiency, and user-friendliness. A vehicle may use various devices and sensors (e.g., LiDAR, cameras, etc.) to sense its environment and navigate around this environment with little to no human input. In a regular manually-driven vehicle, these devices and sensor may assist the vehicle operator to more safely or efficiently operate the vehicle, for example, by using object warning detection indicators, optimizing speed for fuel economy, detecting lane markers and changes, avoiding or minimizing collisions, and/or deploying other relevant vehicle monitoring or maneuvers. In addition, these devices may help take most or full control of vehicle operation from the vehicle operator under some or all circumstances when the transportation management technology is able to recognize a dangerous or risky situation and steer or control the vehicle to avoid or mitigate the situation.

In the case of autonomous vehicles, a vehicle may be equipped with a variety of systems or modules for enabling it to determine its surroundings and safely and automatically navigate to target destinations. For example, an autonomous vehicle may have an integrated computing system (e.g., one or more central processing units, graphical processing units, memory, and storage) for controlling various operations of the vehicle, such as driving and navigating. To that end, the computing system may process data from one or more sensor arrays. For example, an autonomous vehicle may have optical cameras for, e.g., recognizing roads and lane markings, and objects on the road; LiDARs for, e.g., detecting 360° surroundings; infrared cameras for, e.g., night vision; radio detection and ranging (RADAR) for, e.g., detecting distant hazards; stereo vision for, e.g., spotting hazards such as pedestrians or tree branches; wheel sensors for, e.g., measuring velocity; ultra sound for, e.g., parking and obstacle detection; global positioning system (GPS) for, e.g., determining the vehicle's current geolocation; and/or inertial measurement units, accelerometers, gyroscopes, and/or odometer systems for movement or motion detection. Data from these systems and modules may be used by a navigation system to safely guide the autonomous vehicle, even without the aid of a human driver. The autonomous vehicle may also include communication devices for, e.g., wirelessly communicating with one or more servers, user devices (e.g., smartphones, tablet computers, smart wearable devices, laptop computers) and/or other vehicles.

Successful and safe navigation of a vehicle depends on having accurate data measurement and representation of the external environment at all times. In particular embodiments, to maintain an accurate representation or three-dimensional model of the external environment, an optical camera may capture a picture of the external environment, and a LiDAR instrument may use a light beam to measure the distance to various objects in the external environment. An optical camera works by taking a color image profile of the environment, and the data collected can be processed to read signs, navigate along road markings, recognize moving or stationary objects relevant to the movement of the vehicle, and other important visual driving cues. Multiple optical cameras (e.g., between four to six cameras) may be used to create a three-dimensional image by image stitching the data from each of the optical cameras. A LiDAR instrument works by emitting a light beam out into the world and measuring the time it takes to return to obtain a depth profile of the environment. The return time for each return light beam is combined with the location of the LiDAR instrument to determine a precise location of a surface point of an object. This location is recorded as a three-dimensional point in space, i.e., azimuth, elevation, and range. In some LiDARs, the Doppler information from the target is acquired, providing a 4D data point. Several recorded three-dimensional points may provide an accurate three-dimensional representation of the environment surrounding the LiDAR instrument, which may be referred to as a point cloud. A LiDAR system typically includes a light source, a receiver, a mirror that rotates or tilts on a gimbal, timing electronics, a Global Positioning System (GPS), and an Inertial Measurement Unit (IMU).

Traditionally, the optical cameras and the LiDAR instrument are separate entities placed in proximity with one another. As such, having accurate data of a three-dimensional model of the external environment is highly dependent on proper synchronization of the data collected from the vehicle's optical cameras with the data collected from the LiDAR instrument. However, this often requires complex computations in processing the camera data and LiDAR data to calibrate and align the received image profiles with the respective depth profiles. Moreover, these computations are further complicated by problems in alignment resulting from changes in thermal amplitudes over the course of the day between the two components, the amount of jitter between a camera interface board and the optical cameras, and drift and calibration errors in the LiDAR system caused by vibrations inherent in vehicular movement.

In particular embodiments, an imaging and range measurement system may be constructed such that the system uses a common transmitter and a common receiver and has perfect overlap of the field of view for the image and depth data collected for the LiDAR sensor and the imaging sensor, in which the imaging sensor (e.g., camera) and LiDAR sensor are one example of the imaging and range measurement system components. The imaging and range measurement system may have a light source to direct light out of the common transmitter and a common receiver that receives the return light beams, which are then directed to a beam splitter that directs different wavelengths of light to a LiDAR sensor and a color sensor within the imaging and range measurement system. In particular embodiments, multiple LiDAR sensors (e.g., TOF CMOS sensor, InGaAs sensor) may be used for processing data of different wavelengths. In addition, the light source may include an optical switch for switching between different lasers with different wavelengths, which may trigger the different lasers to transmit light at the same time or at different times.

The imaging and range measurement system may have several advantages over separate imaging sensors and LiDAR sensors placed next to each other. The combined camera and LiDAR sensor may help reduce processing power by maintaining calibration between the LiDAR sensor and the imaging sensor over its lifetime and using the same field of view to receive both the LiDAR and image data, and thus the resulting depth and image data is synchronized as collected and no alignment processing is needed. In addition, because particular embodiments of the combined camera and lidar sensor may be a solid-state device with no moving parts, the combined system is athermalized, extremely physically stable, and may be combined into a very small package. Moreover, the benefits of using the different wavelengths of light include different penetration profiles, less eye safety issues, and longer range (but narrower field of view).

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Figure 1:
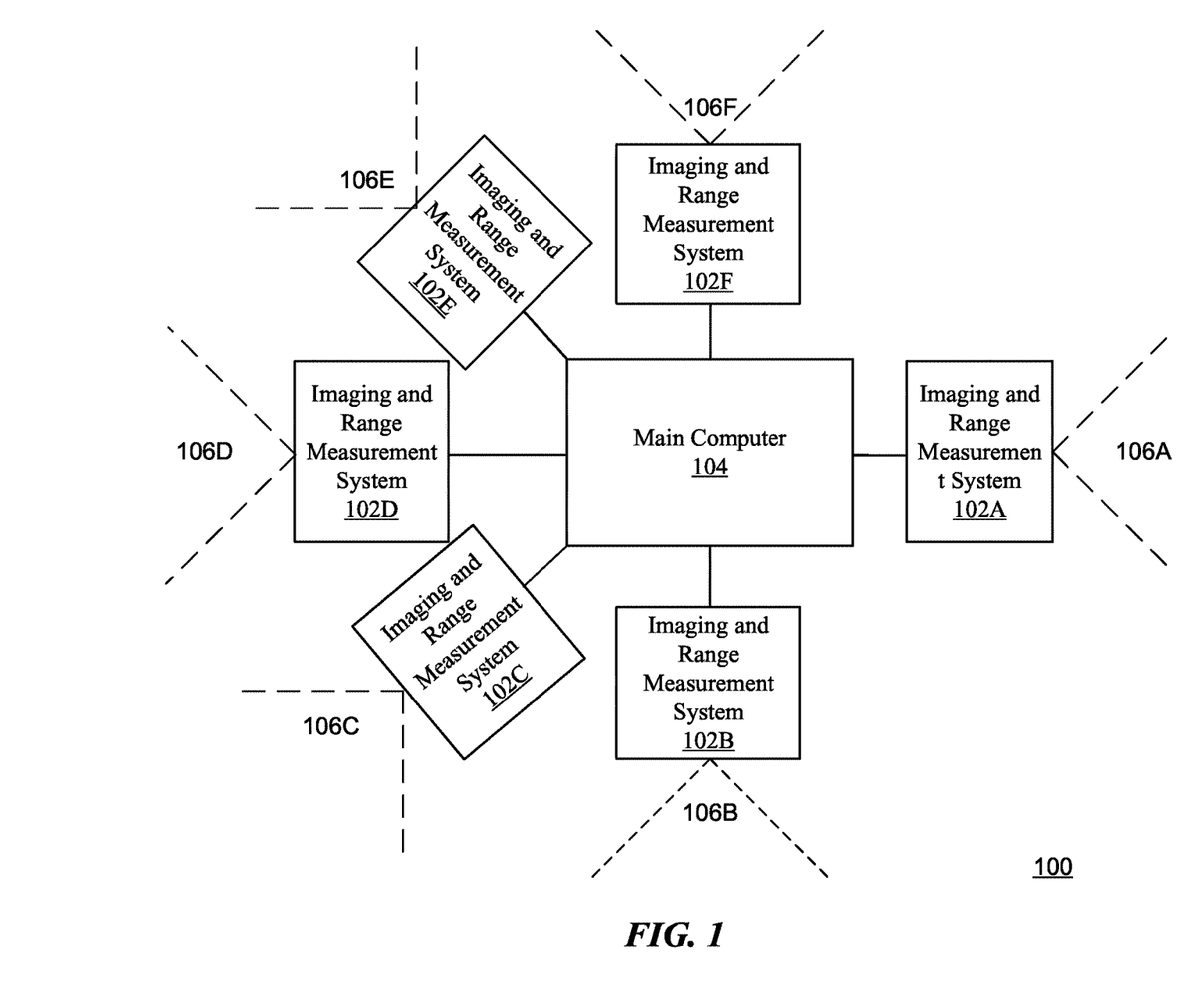
FIG. 1 illustrates an overview of a camera and LiDAR system in an automotive sensor system.

FIG. 1 illustrates an overview of an imaging and range measurement system in an automotive sensor system. As illustrated in the example of FIG. 1, automotive sensor system 100 may include imaging and range measurement systems 102A, 102B, 102C, 102D, 102E, and 102F that are coupled to a main computer 104 of a vehicle (e.g., a manual-driven vehicle, an autonomous vehicle, or any other suitable vehicle). The imaging and range measurement systems 102A-102E may each correspond to a field of vision 106A, 106B, 106C, 106D, 106E, and 106F, respectively, in a ring to capture a 360° view of the environment. In particular embodiments, the number of imaging and range measurement systems may be different from that shown in FIG. 1, such as a configuration with four imaging and range measurement systems, eight imaging and range measurement systems, or any other suitable number of imaging and range measurement systems. As described in more detail below, each camera and LiDAR sensor system (e.g., 102A) may include an image sensor (e.g., a camera) that is configured to capture individual photo images or a series of images as a video, and may also include a LiDAR range measurement sensor system that is configured to capture a depth profile of the environment. Although this disclosure describes and illustrates a particular automotive sensor system having a particular configuration and number of components, this disclosure contemplates any suitable automotive sensor system having any suitable configuration and number of components.

Figure 2:
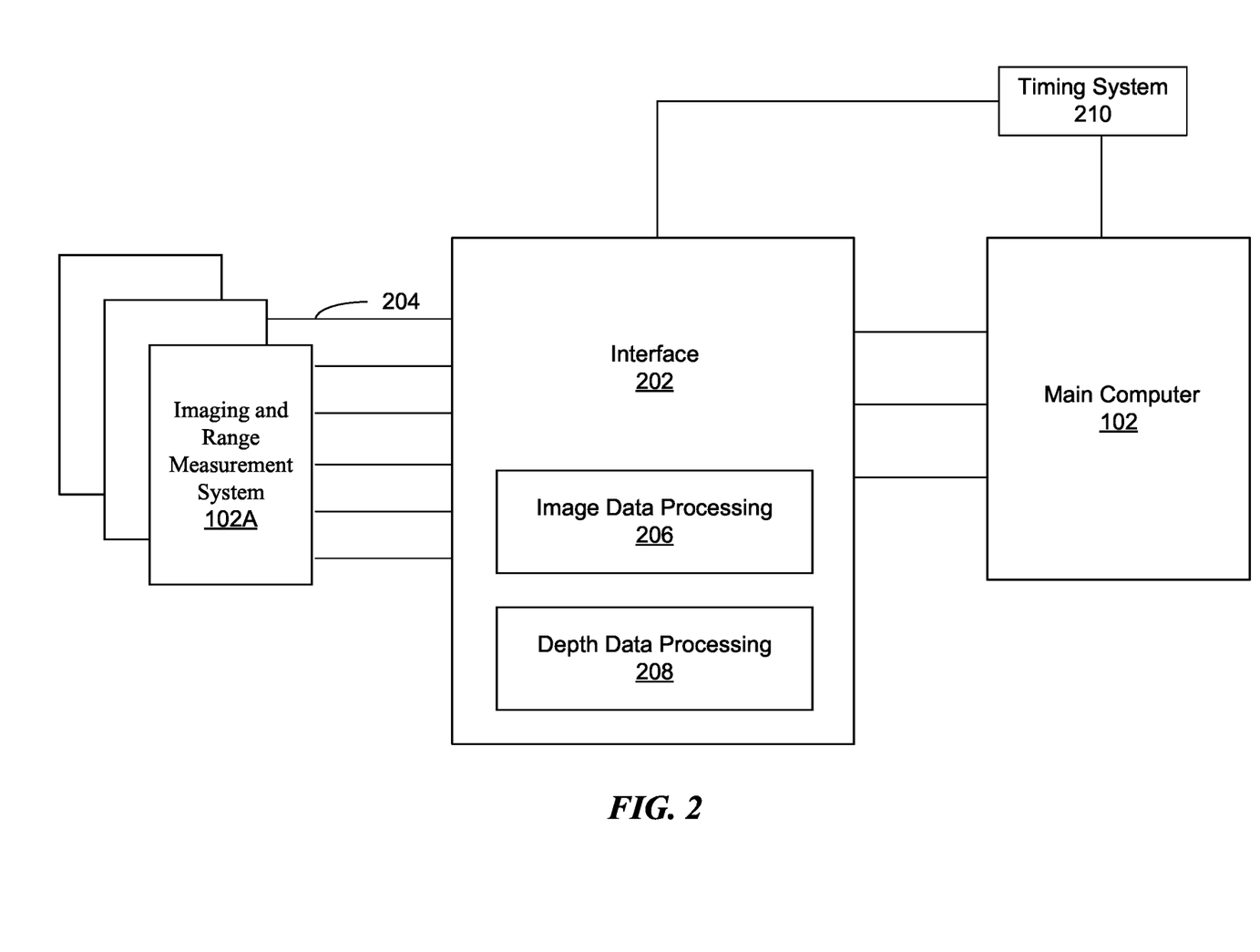
FIG. 2 illustrates an example schematic of a imaging and range measurement system.

FIG. 2 illustrates an example schematic of an imaging and range measurement system. As illustrated in the example of FIG. 2, each of the imaging and range measurement systems 102A-102E may be connected to an interface 202 through a respective serial link 204. Interface 202 may be mounted inside the vehicle or outside the vehicle (e.g., on the roof) within the sensor array, which is discussed in more detail below. Further, interface 202 may multiplex power, timing, and control data sent to respective imaging and range measurement systems 102A-102E and data received from the respective imaging and range measurement systems 102A-102E connected by its serial link 204. In particular embodiments, interface 202 may include image data processing 206 and depth data processing 208. Image data processing 206 may process the image profile data received from imaging and range measurement systems 102A-102E received via serial link 204. In addition, depth data processing 208 may process the depth image data received from imaging and range measurement systems 102A-102E received via serial link 204.

In particular embodiments, a timing system 210 coupled to interface 202 may provide timing information for operating one or more light sources associated with each of the imaging and range measurement systems 102A through serial link 204. Further, timing system 210 is coupled to main computer 102 of the vehicle and may provide timestamp information of the image profile data and depth profile data that is captured by imaging and range measurement systems 102A-102E. In particular embodiments, main computer 102 of the vehicle may interface with the outside world and control the overall function of the vehicle. Although this disclosure describes and illustrates a schematic of an imaging and range measurement system having a particular configuration of components, this disclosure contemplates any suitable imaging and range measurement system having any suitable configuration of components.

Figure 3:
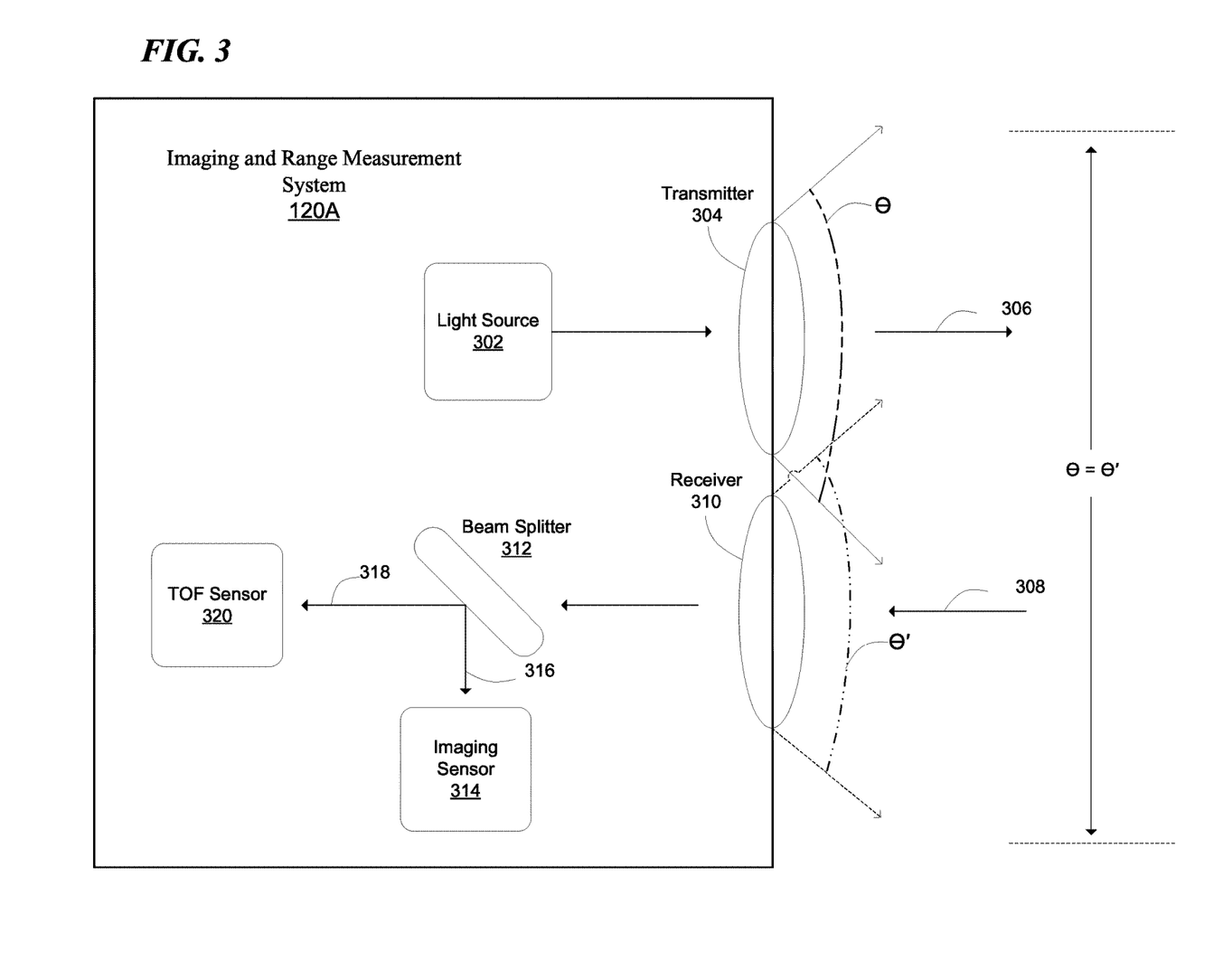
FIG. 3 illustrates example internal components of a imaging and range measurement system.

FIG. 3 illustrates example internal components of an imaging and range measurement system. This system may be used in a manual-driven vehicle, an autonomous vehicle, or any other suitable vehicle for intelligent transportation management and user interaction to help optimize vehicle safety, efficiency, and user-friendliness. As illustrated in the example of FIG. 3, imaging and range measurement system 102A includes a light source 302, which may be an infrared light source, laser light source, or other suitable light source. Light source 302 may direct one or more light beams 306 through a transmitter 304 to the environment surrounding the vehicle. As an example and not by way of limitation, light beams 306 may have a wavelength between 840 nm to 904 nm. This wavelength range may be significant due to the availability of inexpensive lasers and atmospheric windows where humidity and water vapor have little absorption. One or more return light beams 308 may be received by a receiver 310 and directed through a beam splitter 312, which may then separate received light beams 308 and reflect them to different sensors simultaneously as a function of wavelength. As an example and not by way of limitation, beam splitter 312 may be a dichroic mirror. In particular embodiments, received light beam 308 may be separated into a first portion 316 that is directed to a imaging sensor 314 (e.g., a red-green-blue (RGB) camera sensor) for receiving and processing image profile data. As an example and not by way of limitation, first portion 316 of received light beams 308 may have a wavelength between 390 nm to 780 nm. In addition, received light beam 308 may also be separated into a second portion 318 that is directed to a LiDAR sensor 320 (e.g., a time-of-flight (TOF) sensor) for receiving and processing depth profile data. As an example and not by way of limitation, second portion 318 of received light beams 308 may have a wavelength of 780 nm or higher.

In particular embodiments, with regard to the field of view for imaging and range measurement system 120A, transmitter 304 has an associated field of view ⊖ and receiver 310 has an associated field of view ⊖'. Field of view ⊖ for transmitter 304 may completely overlap field of view ⊖' for receiver 310 such that transmitter 304 and receiver 310 share the same field of view ⊖ and ⊖', which are equal to each other and correspond to the same field of view, as shown in FIG. 3. In other words, received light beams 308 (e.g., the return light beams) that are separated into first portion 316 and second portion 318 are received from a "same" or "shared" field of view ⊖/⊖'. In addition, light beams 306 is directed out into the environment through transmitter 304, and received light beams 308 is received through receiver 310 that is common to both imaging sensor 314 and LiDAR sensor 320. As discussed above, having the same field of view for receiving and processing data using a LiDAR sensor and a imaging sensor with a common transmitter and receiver has the advantage of allowing the imaging and range measurement system to collect data that is already synchronized without any additional data processing and thus not requiring any calibration and alignment (e.g., as would be needed a configuration with separate LiDAR and imaging sensors) due to the perfect overlap of the image and depth profile data received by the system. Moreover, additional advantages of the imaging and range measurement system may include being constructed as an athermalized, solid-state device with no moving parts with the benefit of fitting into a very small package.

Figure 4A:
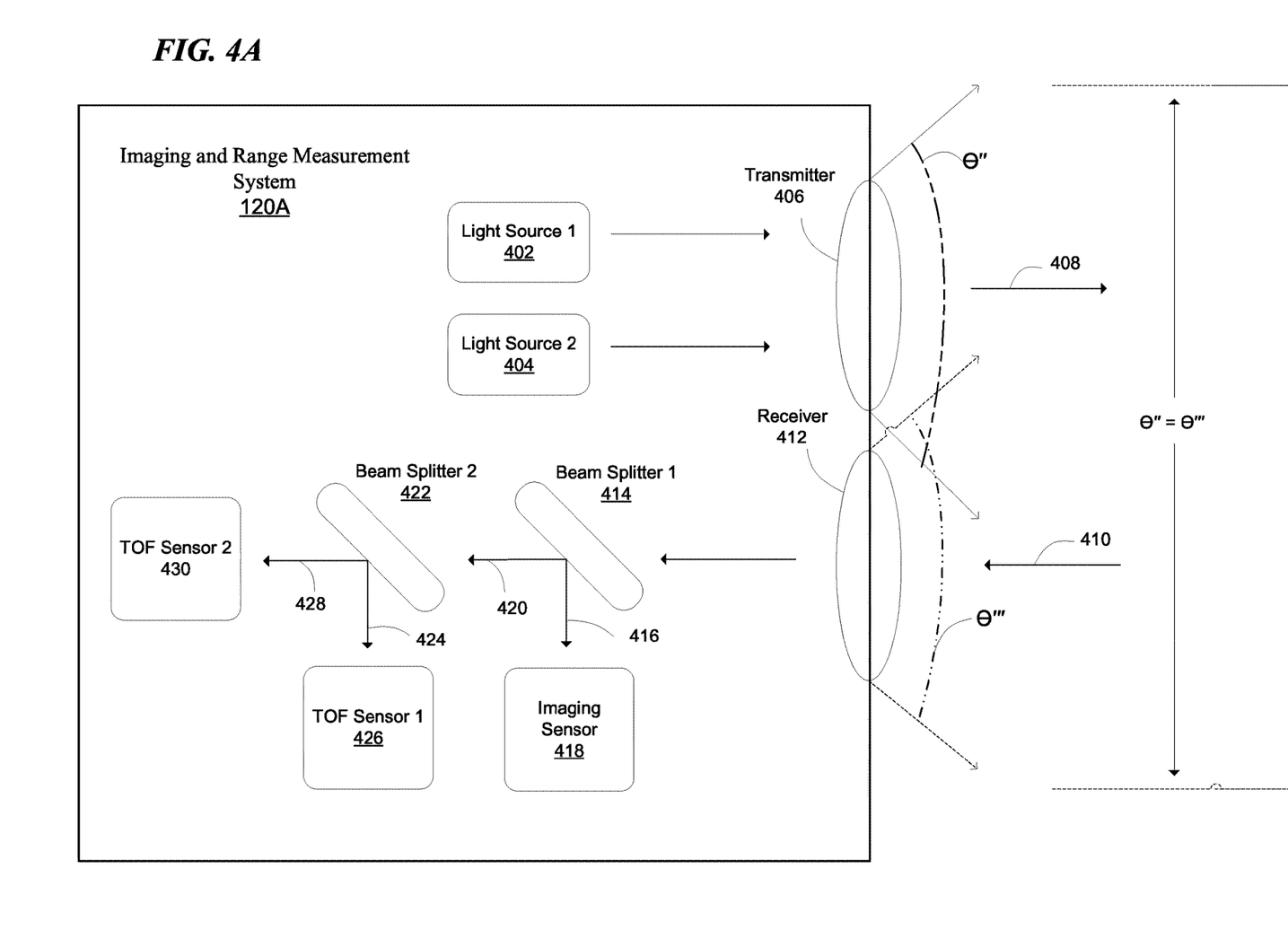
FIG. 4A illustrates an example of a imaging and range measurement system with multiple transmitters for transmitting multiple wavelengths.
Figure 4B:
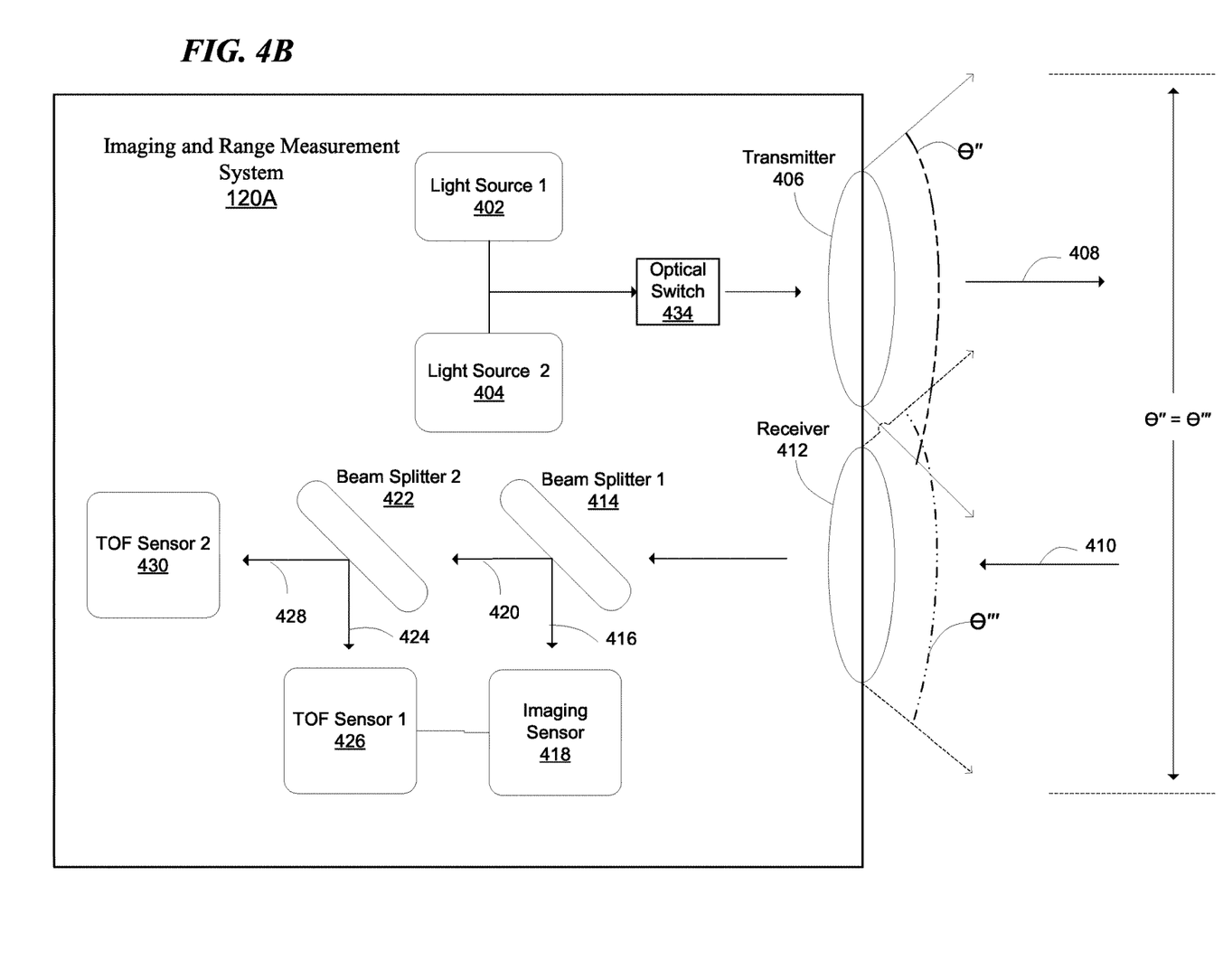
FIG. 4B illustrates an example of a imaging and range measurement system with an optical switch.

In particular embodiments, different wavelengths of light may be used in order to have different penetration profiles, less eye safety issues, and longer image range with a concurrent narrower field of view. FIG. 4A illustrates an example of an imaging and range measurement system (similar to the system illustrated in FIG. 3) with multiple transmitters for transmitting multiple wavelengths. FIG. 4B illustrates an example of an imaging and range measurement system (similar to the system illustrated in FIG. 3) with an optical switch. As illustrated in the example of FIG. 4A, imaging and range measurement system 102A includes a first light source 402 and a second light source 404. Light sources 402, 404 may be infrared light sources, laser light sources, other suitable light sources, or any combination thereof. Light sources 402 and 404 may each direct one or more light beams 408 through a transmitter 406 to the environment surrounding the vehicle. Light sources 402 and 404 may transmit light beams 408 at the same time, or at different times (e.g., with a time period offset as dictated by timing system 210). As an example and not by way of limitation, first light source 402 may transmit light beams 408 at a wavelength between 840 nm to 904 nm, and second light source 404 may transmit light beams 406 at a wavelength of 1550 nm. This wavelength may be significant due to various reasons including telecommunication wavelengths, relatively inexpensive laser and optical components, eye safety, and no absorption by water vapor.

One or more return light beams 410 (e.g., the return light beams) may be received by a receiver 412 and directed through a first beam splitter 414, which may then separate received light beams 410 and reflect them to different sensors and to another beam splitter simultaneously as a function of wavelength. As an example and not by way of limitation, beam splitter 414 may comprise a dichroic mirror. In particular embodiments, received light beam 410 may be separated into a first portion 416 that is directed to a imaging sensor 418 (e.g., a RGB sensor) for receiving and processing image profile data. As an example and not by way of limitation, first portion 416 of received light beams 410 may have a wavelength between 390 nm to 780 nm. In addition, received light beam 410 may also be separated into a second portion 420 that is directed to a second beam splitter 422. This second beam splitter 422 may then separate second portion 420 of received light beams 410 into a third portion 424 that is directed to a first LiDAR sensor 426 and a fourth portion 428 that is directed to a second LiDAR sensor 430. First and second LiDAR sensor 426, 430 may each be a TOF sensor, an indium-gallium-arsenide (InGaAs) sensor, or any other sensor suitable for receiving and processing depth profile data. As an example and not by way of limitation, third portion 424 of received light beams 410 may have a wavelength between 840 nm to 904 nm, which may be processed using a TOF sensor, and fourth portion 428 of received light beams 410 may have a wavelength of 1550 nm, which may be processed using an InGaAs sensor. In particular embodiments, transmitter 406 has an associated field of view $\Theta''$ and receiver 412 has an associated field of view $\Theta'''$. Field of view $\Theta''$ for transmitter 46 may completely overlap field of view $\Theta'''$ for receiver 412 such that transmitter 46 and receiver 412 share the same field of view $\Theta''$ and $\Theta'''$, which are equal to each other and correspond to the same field of view, as shown in FIG. 4. In other words, received light beams 410 that are separated into first portion 416, second portion 420, third portion 424, and fourth portion 428 are received from a same field of view $\Theta''/\Theta'''$. In addition, received light beams 410 is received through receiver 412 that is common to imaging sensor 418, first LiDAR sensor 426, and second LiDAR sensor 430.

FIG. 4B illustrates a similar configuration as FIG. 4A with the addition of an optical switch or an optical combiner for more refined control of first and second light sources 402 and 404. As illustrated in the example of FIG. 4B, combined first and second light sources 402 and 404 are both connected to optical switch 434, which may switch between first light source 402 and second light source 404 in order to trigger them at the same time, or at different times. In particular embodiments, first light source 402 and second light source 404 may be triggered to transmit light at different times with a time period offset as determined by timing system 210. As an example and not by way of limitation, the optical switch may be for switching between two lasers with different wavelengths (e.g., 850 nm and 940 nm, 1024 nm and 940 nm, etc.). The wavelength of the lasers may be selected from a range outside of the 390 nm-780 nm visible range so that the lasers do no interfere with camera function. In particular embodiments, optical switch 434 for use with multiple light sources may result in the multiple components advantageously sharing as many optical components as possible, and also to help with the exact overlapping of the field of view (as discussed above). Although this disclosure describes and illustrates an imaging and range measurement system having a particular configuration of components, this disclosure contemplates any suitable imaging and range measurement system having any suitable configuration of components.

Figure 5:
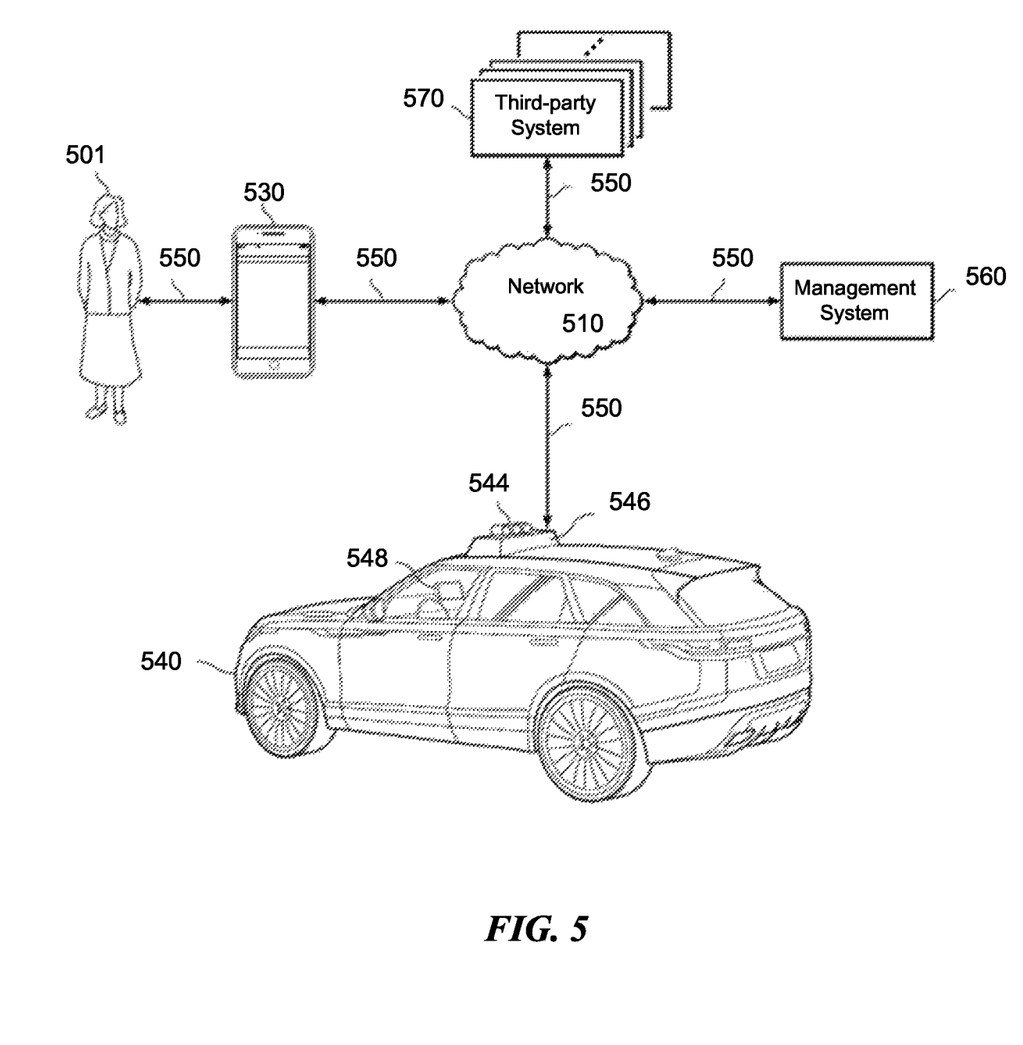
FIG. 5 illustrates an example block diagram of a transportation management environment.

FIG. 5 illustrates an example block diagram of a transportation management environment for matching ride requestors with vehicles. This transportation management environment may be used in a manual-driven vehicle, an autonomous vehicle, or any other suitable vehicle for intelligent transportation management and user interaction to help optimize vehicle safety, efficiency, and user-friendliness, as discussed above. In particular embodiments, the vehicle 540 may be an autonomous vehicle and equipped with an array of sensors 544, a navigation system 546, and a ride-service computing device 548. In particular embodiments, a fleet of vehicles 540 may be managed by the transportation management system 560. The fleet of vehicles 540, in whole or in part, may be owned by the entity associated with the transportation management system 560, or they may be owned by a third-party entity relative to the transportation management system 560. In either case, the transportation management system 560 may control the operations of the vehicles 540, including, e.g., dispatching select vehicles 540 to fulfill ride requests, instructing the vehicles 540 to perform select operations (e.g., head to a service center or charging/fueling station, pull over, stop immediately, self-diagnose, lock/unlock compartments, change music station, change temperature, and any other suitable operations), and instructing the vehicles 540 to enter select operation modes (e.g., operate normally, drive at a reduced speed, drive under the command of human operators, and any other suitable operational modes).

In particular embodiments, the vehicles 540 may receive data from and transmit data to the transportation management system 560 and the third-party system 570. Example of received data may include, e.g., instructions, new software or software updates, maps, 3-D models, trained or untrained machine-learning models, location information (e.g., location of the ride requestor, the vehicle 540 itself, other vehicles 540, and target destinations such as service centers), navigation information, traffic information, weather information, entertainment content (e.g., music, video, and news) ride requestor information, ride information, and any other suitable information. Examples of data transmitted from the vehicle 540 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 540, passengers may send/receive data to the transportation management system 560 and/or third-party system 570), and any other suitable data.

In particular embodiments, vehicles 540 may also communicate with each other as well as other traditional human-driven vehicles, including those managed and not managed by the transportation management system 560. For example, one vehicle 540 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) and/or over a network (e.g., the Internet or via the transportation management system 560 or third-party system 570).

In particular embodiments, a vehicle 540 may obtain and process sensor/telemetry data. Such data may be captured by any suitable sensors. In particular embodiments, vehicle 540 may include optical cameras that have an image sensor that is configured to capture individual photo images or a series of images as a video. As an example and not by way of limitation, the optical cameras may include a charge-coupled device (CCD) image sensor or a complementary metal-oxide-semiconductor (CMOS) active-pixel image sensor. In particular embodiments, the optical camera may include a lens or lens assembly to collect and focus incoming light onto the focal area of the image sensor. As an example and not by way of limitation, the optical camera may include a fisheye lens, ultra-wide-angle lens, wide-angle lens, or normal lens to focus light onto the image sensor. The optical cameras may be arranged in a circle or ring that is configured to capture images over a 360° panoramic view. In particular embodiments, the optical cameras of the vehicle may be organized using a pre-determined number (e.g., 6) with overlapping field of views to capture 3-D visual data. Although this disclosure describes and illustrates particular optical cameras having particular image sensors and lenses arranged in a particular configuration, this disclosure contemplates any suitable optical cameras having any suitable image sensors and lenses arranged in any suitable configuration.

In particular embodiments, the vehicle 540 may have a LiDAR sensor array of multiple LiDAR transceivers that are configured to rotate 360°, emitting pulsed laser light and measuring the reflected light from objects surrounding vehicle 540. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary. A LiDAR is an effective sensor for measuring distances to targets, and as such may be used to generate a 3-D model of the external environment of the vehicle 540. In particular embodiments, the LiDAR sensor array may include one or more TOF sensors, one or more InGaAs sensor, any other suitable sensors, or any combination thereof.

In particular embodiments, the 3-D model may represent the external environment including objects such as other cars, curbs, debris, objects, and pedestrians up to a maximum range of the sensor arrangement (e.g., 50, 100, or 200 meters). As an example and not by way of limitation, the vehicle 540 may have optical cameras pointing in different directions. The cameras may be used for, e.g., recognizing roads, lane markings, street signs, traffic lights, police, other vehicles, and any other visible objects of interest. To enable the vehicle 540 to "see" at night, infrared cameras may be installed. In particular embodiments, the vehicle may be equipped with stereo vision for, e.g., spotting hazards such as pedestrians or tree branches on the road. As another example, the vehicle 540 may have radars for, e.g., detecting other vehicles and/or hazards afar. Furthermore, the vehicle 540 may have ultra sound equipment for, e.g., parking and obstacle detection.

In particular embodiments, in addition to sensors enabling the vehicle 540 to detect, measure, and understand the external world around it, the vehicle 540 may further be equipped with sensors for detecting and self-diagnosing the its own state and condition. For example, the vehicle 540 may have wheel sensors for, e.g., measuring velocity; global positioning system (GPS) for, e.g., determining the vehicle's current geolocation; and/or inertial measurement units, accelerometers, gyroscopes, and/or odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieving using any combination of sensors. For example, a vehicle 540 may build a 3D model of its surrounding based on data from its LiDAR, radar, sonar, and cameras, along with a pre-generated map obtained from the transportation management system 560 or the third-party system 570. Although sensors 544 appear in a particular location on vehicle 540 in FIG. 5, sensors 544 may be located in any suitable location in or on vehicle 540. Example locations for sensors include the front and rear bumpers, the doors, the front windshield, on the side paneling, or any other suitable location.

In particular embodiments, the vehicle 540 may be equipped with a processing unit (e.g., one or more CPUs and GPUs), memory, and storage. The vehicle 540 may thus be equipped to perform a variety of computational and processing tasks, including processing the sensor data, extracting useful information, and operating accordingly. For example, based on images captured by its optical cameras and a machine-vision model, the vehicle 540 may identify particular types of objects captured by the images, such as pedestrians, other vehicles, lanes, curbs, and any other objects of interest.

In particular embodiments, processing unit associated with vehicle 540 may receive autonomous-vehicle sensor data that represents an external environment within a threshold distance of vehicle 540. In particular embodiments, the computing device may be a ride-service computing device, navigation system, or may be any other suitable computing device associated with vehicle 540. The autonomous-vehicle sensor data may be collected via sensors arranged on the outside or the inside of vehicle 540. The autonomous-vehicle sensor data may enable vehicle 540 to identify objects in the surrounding external environment, such as other vehicles, obstacles, traffic signage, cyclists, or pedestrians.

In particular embodiments, the autonomous-vehicle sensor data may represent a three-dimensional schema of the external environment of vehicle 540. As an example and not by way of limitation, the three-dimensional schema may represent the external environment including objects such as for example other cars and pedestrians up to a maximum range of the sensor array 144 (e.g. 100 meters). In particular embodiments, at least some of the autonomous-vehicle sensor data may be labeled to include references to objects that are within a threshold distance from vehicle 540. The autonomous-vehicle sensor data may further enable vehicle 540 to identify the road upon which it is driving, lanes in the road, or any other suitable object.

In particular embodiments, vehicle 540 may combine the autonomous-vehicle sensor data from multiple types of sensors with other types of data to detect roadways, buildings, traffic signs, and other objects. The other types of data may include data acquired from third parties. Examples of other types of data acquired from third parties include map data, traffic data, weather data, ratings data (e.g. from an online review website or another third-party ratings entity) or any other suitable type of data. Although this disclosure describes receiving sensor data in a particular manner, this disclosure contemplates receiving sensor data in any suitable manner.

In particular embodiments, the vehicle 540 may have a navigation system 546 responsible for safely navigating the vehicle 540. In particular embodiments, the navigation system 546 may take as input any type of sensor data from, e.g., a Global Positioning System (GPS) module, inertial measurement unit (IMU), LiDAR transceivers, optical cameras, radio frequency (RF) transceivers, or any other suitable telemetry or sensory mechanisms. The navigation system 546 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 546 may use its determinations to control the vehicle 540 to operate in prescribed manners and to guide the vehicle 540 to its destinations without colliding into other objects. Although the physical embodiment of the navigation system 546 (e.g., the processing unit) appears in a particular location on vehicle 540 in FIG. 5, navigation system 546 may be located in any suitable location in or on vehicle 540. Example locations for navigation system 546 include inside the cabin or passenger compartment of vehicle 540, near the engine/battery, near the front seats, rear seats, or in any other suitable location. A vehicle 540 may include one or more sensors of various types in a sensor array to capture information of the external environment of vehicle 540. Although sensor array 544 is illustrated in a particular location on vehicle 540 in FIG. 5, sensor array 544 may be located in any suitable location in or on vehicle 540. Example locations for sensors include the front and rear bumpers, the doors, the front windshield, on the side paneling, or any other suitable location of vehicle 540. In particular embodiments, a navigation system of vehicle 540 may be any suitable autonomous navigation system, such as for example a navigation system based at least in part on a Global Positioning System (GPS) module, inertial measurement unit (IMU), light detection and ranging (LiDAR) transceivers, optical cameras, radio-frequency (RF) transceivers, ultrasonic sensors, or any other suitable data gathering mechanism. While vehicle 540 is being operated, vehicle 540 may share data (e.g. sensor data, navigation data) with a ride-service system. Autonomous-vehicle sensor data may be captured by any suitable sensor arrangement or array.

Figure 6:
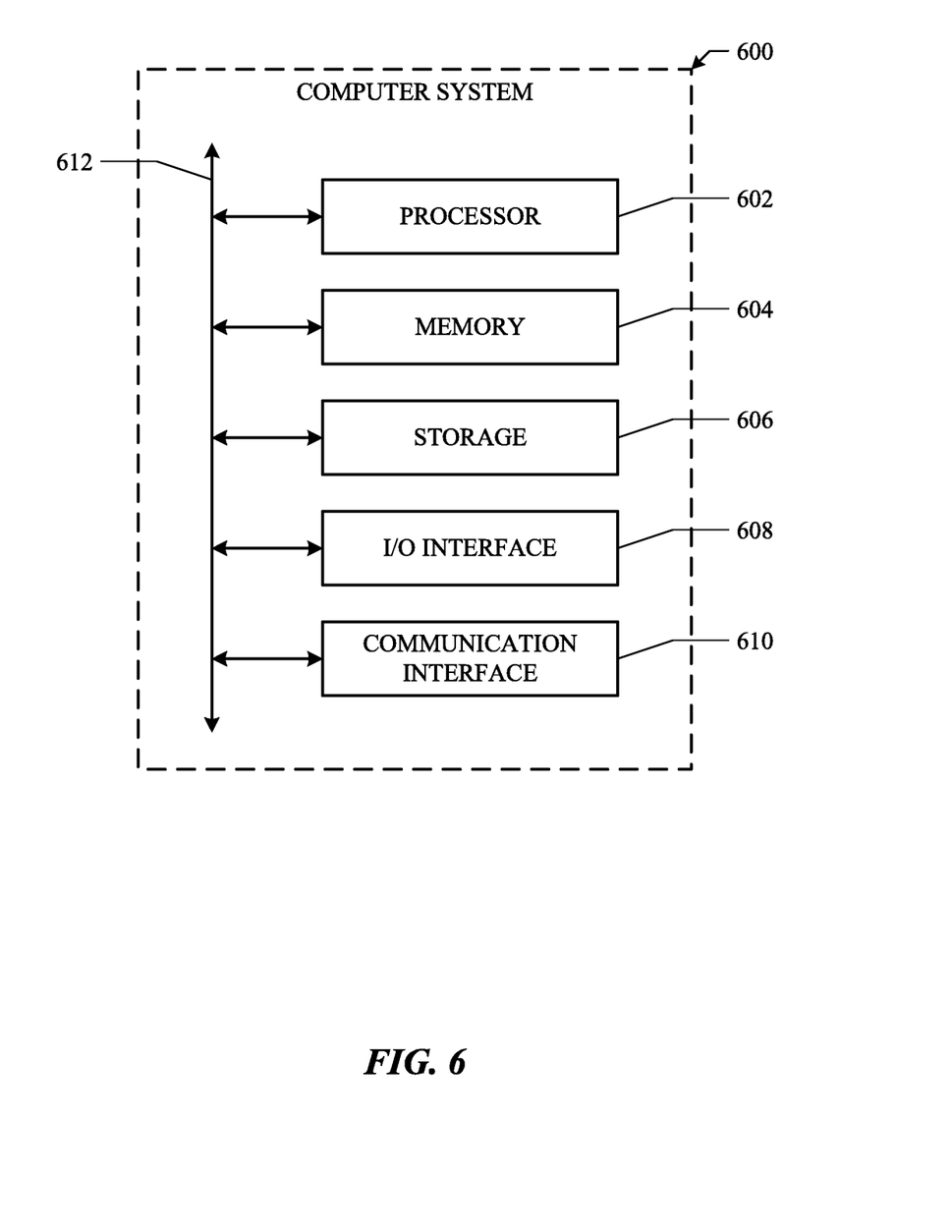
FIG. 6 illustrates an example of a computing system.

FIG. 6 illustrates an example computer system. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described in further detail below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system comprising:
an image sensor operable to detect light and generate image profile data;
a light detection and ranging (LiDAR) sensor operable to detect light and generate depth profile data;
a transmitter operable to transmit, through a shared field of view, a light beam from a light source to an environment, wherein the transmitter comprises an optical switch operable to switch between transmitting the light beam with different wavelength ranges;
a receiver operable to receive, through the shared field of view, at least one return light beam from the environment; and
a beam splitter operable to:
split the at least one return light beam into a first portion of the at least one return light beam and a second portion of the at least one return light beam, the first portion corresponding to a reflection of the light beam transmitted by the transmitter; and
direct (1) the first portion of the at least one return light beam to the LiDAR sensor to cause a portion of the depth profile data to be generated and (2) the second portion of the at least one return light beam to the image sensor to cause a portion of the image profile data to be generated, wherein the portion of the depth profile data is wholly aligned relative to the portion of the image profile data due to the first portion of the at least one return light beam and the second portion of the at least one return light beam being received through the shared field of view.

2. The system of claim 1, wherein the LiDAR sensor and the image sensor share the receiver.

3. The system of claim 1, wherein the system is a solid-state device.

4. The system of claim 1, wherein the first portion and the second portion aligning includes complete overlap of the field of view between the first portion and the second portion.

5. The system of claim 1, further comprising a data processor operable to process the portion of the depth profile data and the portion of the image profile data and output a three-dimensional model of the environment.

6. The system of claim 1, wherein the first portion of the at least one return light beam is associated with infrared light and the second portion of the at least one return light beam is associated with visible light.

7. The system of claim 1, wherein the portion of the depth profile data and the portion of the image profile data are aligned relative to each other based on at least one of location or time.

8. A system comprising:
a transmitter operable to transmit, through a field of view associated with the transmitter, a light beam from a light source to an environment, wherein the transmitter comprises an optical switch operable to switch between transmitting the light beam with different wavelength ranges;
a receiver operable to receive, through a field of view associated with the receiver, at least one return light beam from the environment, wherein the field of view associated with the receiver correspond to the field of view associated with the transmitter; and
a beam splitter operable to:
split the at least one return light beam into a first portion of the at least one return light beam and a second portion of the at least one return light beam; and
direct (1) the first portion of the at least one return light beam to a first sensor to cause a portion of depth profile data to be generated and (2) the second portion of the at least one return light beam to a second sensor to cause a portion of image profile data to be generated, wherein the portion of the depth profile data and the portion of the image profile data are calibrated with each other due to the first portion of the at least one return light beam and the second portion of the at least one return light beam being received through the field of view associated with the receiver that aligns the first portion and the second portion together.

9. The system of claim 8, wherein the first sensor and the second sensor share the receiver.

10. The system of claim 8, wherein the system is a solid-state device.

11. The system of claim 8, wherein the first portion and the second portion aligning includes complete overlap of the field of view between the first portion and the second portion.

12. The system of claim 8, further comprising a data processor operable to process the portion of the depth profile data and the portion of the image profile data and output a three-dimensional model of the environment.

13. The system of claim 8, wherein the first portion of the at least one return light beam is associated with infrared light and the second portion of the at least one return light beam is associated with visible light.

14. The system of claim 8, wherein the portion of the depth profile data and the portion of the image profile data are calibrated with each other based on at least one of location or time.

15. A method comprising:
causing a light beam to be transmitted by a transmitter, through a shared field of view, from a light source to an environment; and
subsequent to receiving, by a receiver, through the shared field of view, at least one return light beam from the environment, wherein the at least one return light beam is split by a beam splitter into a first portion of the at least one return light beam and a second portion of the at least one return light beam, the first portion corresponding to a reflection of the light beam transmitted by the transmitter, the transmitter comprising an optical switch operable to switch between transmitting the light beam with different wavelength ranges:
generating a portion of depth profile data based on the first portion of the at least one return light beam; and
generating a portion of image profile data based on the second portion of the at least one return light beam, wherein the portion of the depth profile data is wholly aligned relative to the portion of the image profile data due to the first portion of the at least one return light beam and the second portion of the at least one return light beam being received through the shared field of view.

16. The method of claim 15, wherein the first portion of the at least one return light beam is directed to a light detection and ranging (LiDAR) sensor for generating the portion of the depth profile data, and wherein the second portion of the at least one return light beam is directed to an image sensor for generating the portion of the image profile data.

17. The method of claim 16, wherein the LiDAR sensor and the image sensor share the receiver.

18. The method of claim 15, wherein the first portion and the second portion aligning includes complete overlap of the field of view between the first portion and the second portion.

19. The method of claim 15, further comprising:
processing the portion of the depth profile data and the portion of the image profile data;
and
outputting a three-dimensional model of the environment based on the processed portions of the depth profile data and the image profile data.

20. The method of claim 15, wherein the first portion of the at least one return light beam is associated with infrared light and the second portion of the at least one return light beam is associated with visible light.

* * * * *